(12) United States Patent
Su

(10) Patent No.: US 10,040,466 B1
(45) Date of Patent: Aug. 7, 2018

(54) HAND TROLLEY

(71) Applicant: BEST CADDY CO., LTD., Kaohsiung (TW)

(72) Inventor: Chung-Shiu Su, Kaohsiung (TW)

(73) Assignee: Best Caddy Co., Ltd., Kaohsiung (TW)

( * ) Notice: Subject to any disclaimer, the term of this patent is extended or adjusted under 35 U.S.C. 154(b) by 0 days.

(21) Appl. No.: 15/632,674

(22) Filed: Jun. 26, 2017

(30) Foreign Application Priority Data

Jun. 3, 2017 (TW) .............................. 106207964 U

(51) Int. Cl.
*B62B 1/04* (2006.01)
*B62B 1/12* (2006.01)
*B62B 5/06* (2006.01)

(52) U.S. Cl.
CPC ................ *B62B 1/12* (2013.01); *B62B 5/064* (2013.01); *B62B 5/067* (2013.01); *B62B 5/06* (2013.01); *B62B 2205/12* (2013.01); *B62B 2205/24* (2013.01); *B62B 2205/33* (2013.01)

(58) Field of Classification Search
CPC ............ B62B 1/04; B62B 1/042; B62B 1/045
USPC ........................................................ 280/652
See application file for complete search history.

(56) References Cited

U.S. PATENT DOCUMENTS

| | | | | |
|---|---|---|---|---|
| 4,754,985 A * | 7/1988 | Im | ............................ | B62B 1/125 280/40 |
| 4,993,727 A * | 2/1991 | vom Braucke | ........... | B62B 1/12 280/40 |
| 5,348,325 A * | 9/1994 | Abrams | ..................... | B62B 1/12 280/40 |
| 5,468,005 A * | 11/1995 | Yang | .......................... | B62B 1/12 280/40 |
| 5,803,471 A * | 9/1998 | DeMars | ................... | B62B 1/125 280/40 |
| 5,984,327 A * | 11/1999 | Hsieh | .................... | A45C 13/385 280/38 |
| 6,053,514 A * | 4/2000 | Su | .............................. | B62B 1/12 280/40 |
| 6,425,599 B1 * | 7/2002 | Tsai | ........................ | B62B 1/125 280/40 |
| RE38,436 E * | 2/2004 | Su | .............................. | B62B 1/12 280/40 |
| 7,097,183 B1 * | 8/2006 | Su | .............................. | B62B 1/12 280/40 |
| 7,140,635 B2 * | 11/2006 | Johnson | ..................... | B62B 1/12 280/646 |
| 7,387,306 B2 * | 6/2008 | Zimmer | ................... | B62B 1/125 280/40 |
| 7,441,785 B1 * | 10/2008 | Tsai | .......................... | B62B 1/12 280/47.29 |

(Continued)

*Primary Examiner* — Jeffrey J Restifo
(74) *Attorney, Agent, or Firm* — Rosenberg, Klein & Lee

(57) ABSTRACT

A hand trolley includes a trolley main body and a handle assembly. The handle assembly includes a handle, a fastener, and an elastic member. The handle is displaced relative to the trolley main body between a folded position and an unfolded position. The fastener is pivotally connected to the handle. The elastic member is connected with the handle and the fastener to provide an elastic force for the fastener to be located at a predetermined fastening position. When the handle is displaced relative to the trolley main body toward the unfolded position, the fastener is pivoted to engage with an engaging portion of the trolley main body.

9 Claims, 9 Drawing Sheets

(56) References Cited

U.S. PATENT DOCUMENTS

| | | | | |
|---|---|---|---|---|
| 7,784,816 B2 * | 8/2010 | Jian | ............................ | B62B 3/02 |
| | | | | 280/38 |
| 7,819,409 B2 * | 10/2010 | Chang | ................... | B62B 5/0083 |
| | | | | 280/47.17 |
| 8,465,029 B2 * | 6/2013 | Yang | ......................... | B62B 1/12 |
| | | | | 280/47.27 |
| 8,602,444 B2 * | 12/2013 | Chang | ....................... | B62B 1/12 |
| | | | | 280/651 |
| 8,936,259 B2 * | 1/2015 | Tsai | ........................... | B62B 1/12 |
| | | | | 280/40 |
| 9,096,249 B2 * | 8/2015 | Gibson | .................... | B62B 1/002 |
| 9,187,106 B2 * | 11/2015 | Khodor | ................... | B62B 1/042 |
| 9,199,655 B1 * | 12/2015 | Su | ............................ | B62B 1/125 |
| 9,327,745 B2 * | 5/2016 | Tsai | ........................ | B62B 1/042 |
| RE46,150 E * | 9/2016 | Liao | ........................... | B62B 3/02 |
| 9,616,907 B1 * | 4/2017 | Gibson | ..................... | B62B 1/12 |

* cited by examiner

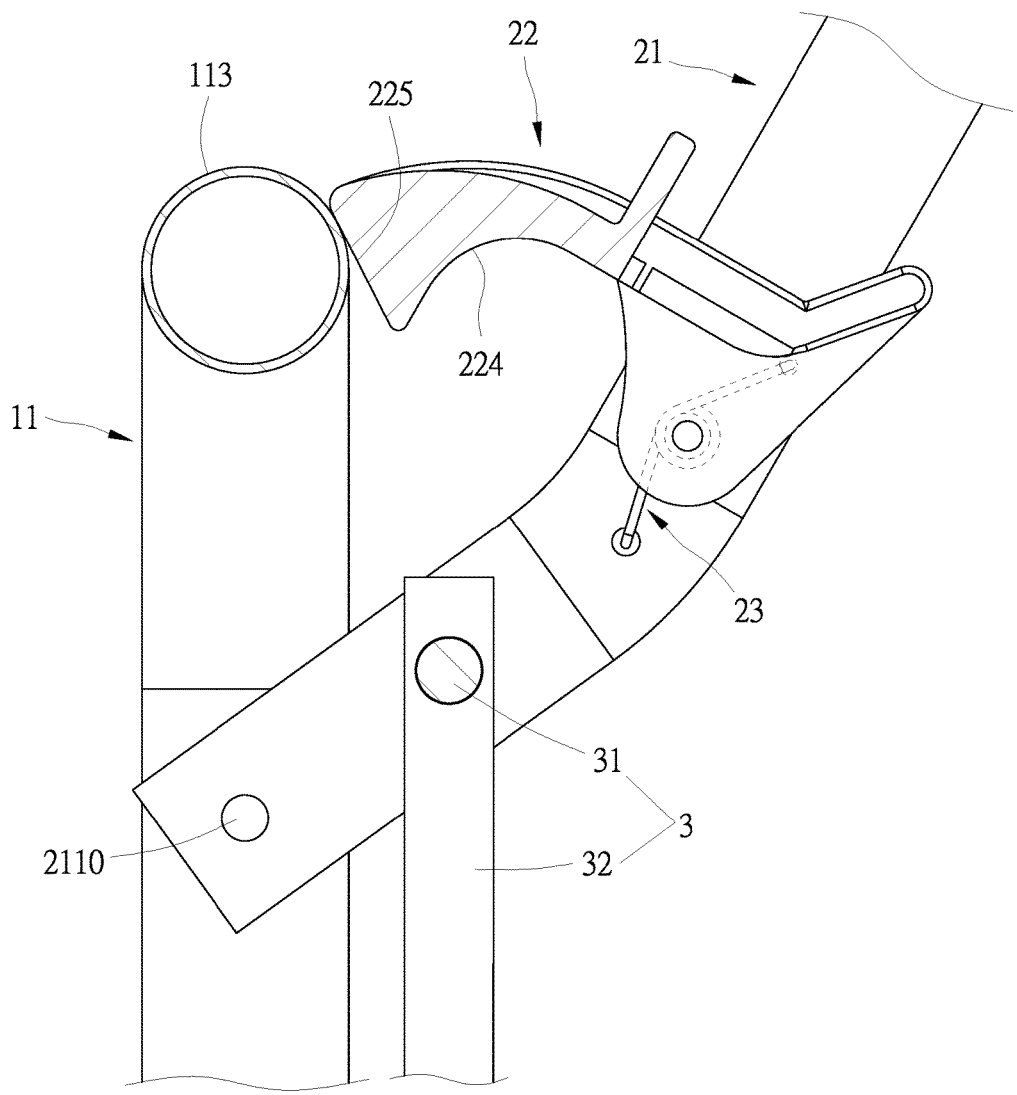
F I G . 7

HAND TROLLEY

FIELD OF THE INVENTION

The present invention relates to a hand trolley, and more particularly to a hand trolley which can be folded and unfolded easily.

BACKGROUND OF THE INVENTION

In general, a hand trolley is provided with a folding structure for storing and carrying the hand trolley conveniently. A conventional hand trolley includes a base and two wheel seats which are foldable relative to a trolley main body.

U.S. Pat. No. 7,140,635 discloses a "portable luggage carts/carriers". As illustrated in FIG. 2 of U.S. Pat. No. 7,140,635, the handle 20, the wheel holder 22, and the support platform 24 are foldable relative to the frame assembly 21. Wherein, the handle 20 includes a locking lever 39. The locking lever 39 is releasably attached to the connecting rod 32 of the frame assembly 21. Although the components are foldable, it is still inconvenient to unfold the hand trolley for use. Accordingly, the inventor of the present invention has devoted himself based on his many years of practical experiences to solve these problems.

SUMMARY OF THE INVENTION

The primary object of the present invention is to provide a hand trolley which can be used conveniently and can be unfolded and positioned easily.

According to one aspect of the present invention, a hand trolley is provided. The hand trolley comprises a trolley main body and a handle assembly. The trolley main body includes an engaging portion. The handle assembly includes a handle, a fastener, and an elastic member. The handle is displaced relative to the trolley main body between a folded position and an unfolded position. The fastener is pivotally connected to the handle. The fastener includes an engaging groove, a guide surface, and a pull portion. The elastic member is connected with the handle and the fastener to provide an elastic force for the fastener to be located at a predetermined fastening position. When the handle is displaced relative to the trolley main body toward the unfolded position, the engaging portion pushes the guide surface of the fastener so that the fastener is pivoted for the engaging groove to be engaged with the engaging portion. When the pull portion is pulled by an external force, the engaging groove of the fastener is disengaged from the engaging portion.

Preferably, the trolley main body includes a main frame and a base. The base is pivotally connected to the main frame. The handle is pivotally connected to the main frame of the trolley main body. The trolley main body further includes a linkage assembly. The linkage assembly includes an actuating lever and a linking lever. The actuating lever is connected to the handle. The actuating lever is located close to the junction of the handle and the trolley main body. Two ends of the linking lever are pivotally connected to the actuating lever and the base of the trolley main body, respectively. When the handle is displaced relative to the trolley main body from the folded position toward the unfolded position, the handle links the base to be pivoted through the linking lever.

Preferably, the handle includes two support rods extending in a same direction, and the actuating lever is fixedly connected between the two support rods.

Preferably, the linking lever has a pivot hole, and the actuating lever is pivotally connected to the pivot hole.

Preferably, the base includes a first linking portion. The trolley main body includes two wheel seats. Each of the wheel seats is pivotally connected to a side rod of the main frame. Each of the wheel seats includes a second linking portion. The second linking portion is connected with the first linking portion for driving the wheel seats to be unfolded or folded when the base is pivoted.

Preferably, the first linking portion and the second linking portion each include a plurality of teeth to mesh with each other.

Preferably, the fastener includes a pivot portion. The pivot portion is pivotally connected to the handle through a shaft. The elastic member is a torsion spring. The torsion spring includes a receiving hole and two connecting ends. The receiving hole is adapted to receive the shaft. The two connecting ends are connected with the fastener and the main frame, respectively.

Preferably, the fastener includes a stop portion, and the stop portion is configured to lean against the handle.

Preferably, the fastener includes a top and a bottom opposite the top. The pull portion is located on the top. The engaging groove is located in the bottom.

According to another aspect of the present invention, a hand trolley is provided. A hand trolley comprises a trolley main body, a handle assembly, and a linkage assembly. The trolley main body includes a main frame, a base, and two wheel seats. The main frame includes a pair of side rods and a transverse rod connected with the pair of side rods. The transverse rod has a engaging portion. The base is pivotally connected to the side rods. The base includes at least one first linking portion. The first linking portion is located close to one of the side rods. The wheel seats are pivotally connected to the side rods, respectively. At least one of the wheel seats includes a second linking portion. The second linking portion is connected with the first linking portion for driving the wheel seats to be unfolded or folded when the base is pivoted. The handle assembly includes a handle, a fastener, and an elastic member. The handle is displaced relative to the trolley main body between a folded position and an unfolded position. The handle includes two support rods extend in a same direction. The fastener is pivotally connected to the handle. The fastener includes an engaging groove, a guide surface, and a pull portion. The elastic member is connected with the handle and the fastener to provide an elastic force for the fastener to be located at a predetermined fastening position. When the handle is displaced relative to the trolley main body toward the unfolded position, the engaging portion pushes the guide surface of the fastener so that the fastener is pivoted for the engaging groove to be engaged with the engaging portion. When the pull portion is pulled by an external force, the engaging groove of the fastener is disengaged from the engaging portion. The linkage assembly includes an actuating lever and a linking lever. The actuating lever is connected between the two support rods. The actuating lever is located close to the junction of the handle and the trolley main body. Two ends of the linking lever are pivotally connected to the actuating lever and the base of the trolley main body, respectively. When the handle is displaced relative to the trolley main body from the folded position toward the unfolded position, the handle links the base to be pivoted through the linking lever.

According to the above technical features, the present invention can achieve the following effects:

1. The fastener of the handle assembly is pivotally connected to the handle and is biased by the elastic member to fasten the trolley main body. It is easy to fasten and position the trolley main body.

2. The fastener has the guide surface. When the handle is unfolded, the fastener can be pivoted to engage with the trolley main body easily through the guide surface.

3. The fastener is provided with the pull portion to facilitate the user to pull the fastener away from the trolley main body.

4. The handle can link the base to be unfolded through the linkage assembly, thereby enhancing the convenience of unfolding the hand trolley.

5. When unfolded, the base links the wheel seats to be unfolded, thereby enhancing the convenience of unfolding the hand trolley.

6. The base and the wheel seats are linked by means of teeth, so that the base and the wheel seats are folded and unfolded stably.

7. The elastic member adopts a torsion spring which facilitates the assembly.

8. The fastener may include the stop portion to limit the pivot range of the fastener.

9. The pull portion is located on the top of the fastener, so that when the handle is unfolded, the pull portion is near the user, allowing the user to operate the hand trolley conveniently.

BRIEF DESCRIPTION OF THE DRAWINGS

FIG. 7 is a first schematic view showing the fastening operation of the faster in accordance with the preferred embodiment of the present invention;

DETAILED DESCRIPTION OF THE PREFERRED EMBODIMENTS

Embodiments of the present invention will now be described, by way of example only, with reference to the accompanying drawings.

Figure 1:
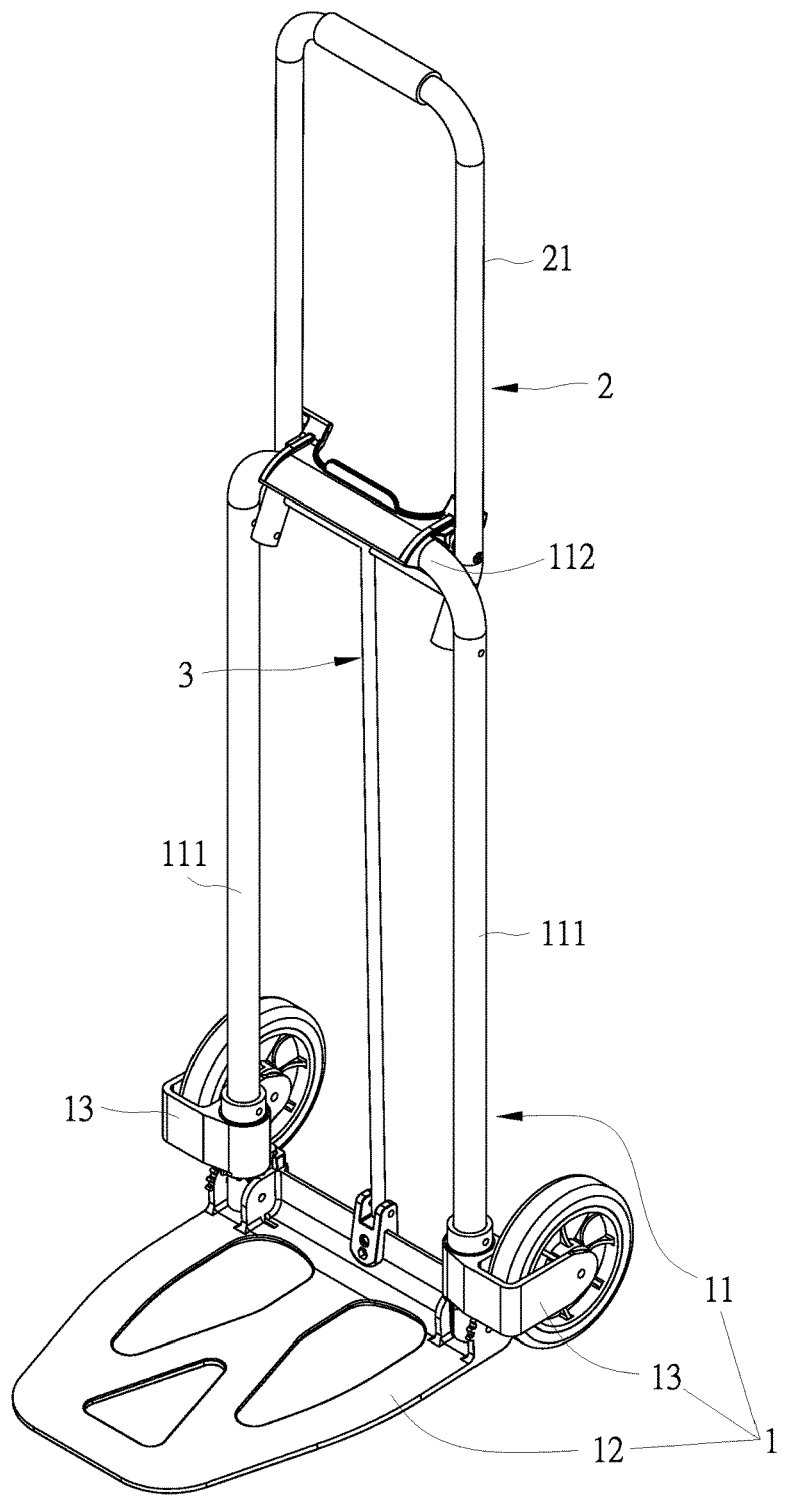
FIG. 1 is a perspective view in accordance with a preferred embodiment of the present invention in an unfolded state.
Figure 2:
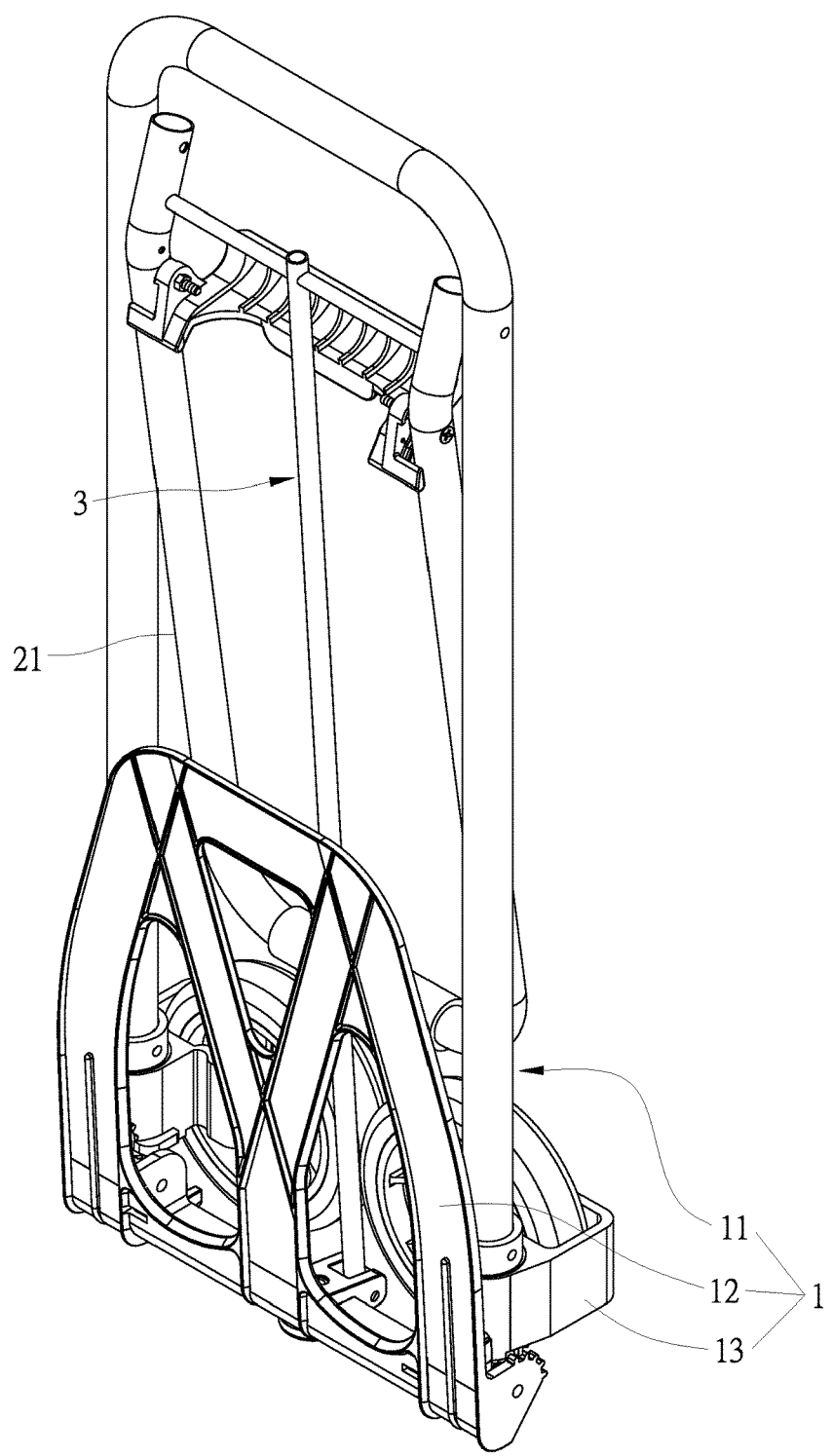
FIG. 2 is a perspective view in accordance with the preferred embodiment of the present invention in a folded state.

Referring to FIG. 1 and FIG. 2, a hand trolley in accordance with a preferred embodiment of the present invention comprises a trolley main body (1) and a handle assembly (2). The trolley main body (1) comprises a main frame (11), a base (12), and two wheel seats (13). The handle assembly (2) comprises a handle (21). In this embodiment, the base (12), the wheel seats (13) and the handle (21) can be folded or unfolded relative to the main frame (11). Preferably, the hand trolley further comprises a linkage assembly (3) for the handle (21) to directly link the base (12) and indirectly link the wheel seats (13) to be folded or unfolded.

Figure 3:
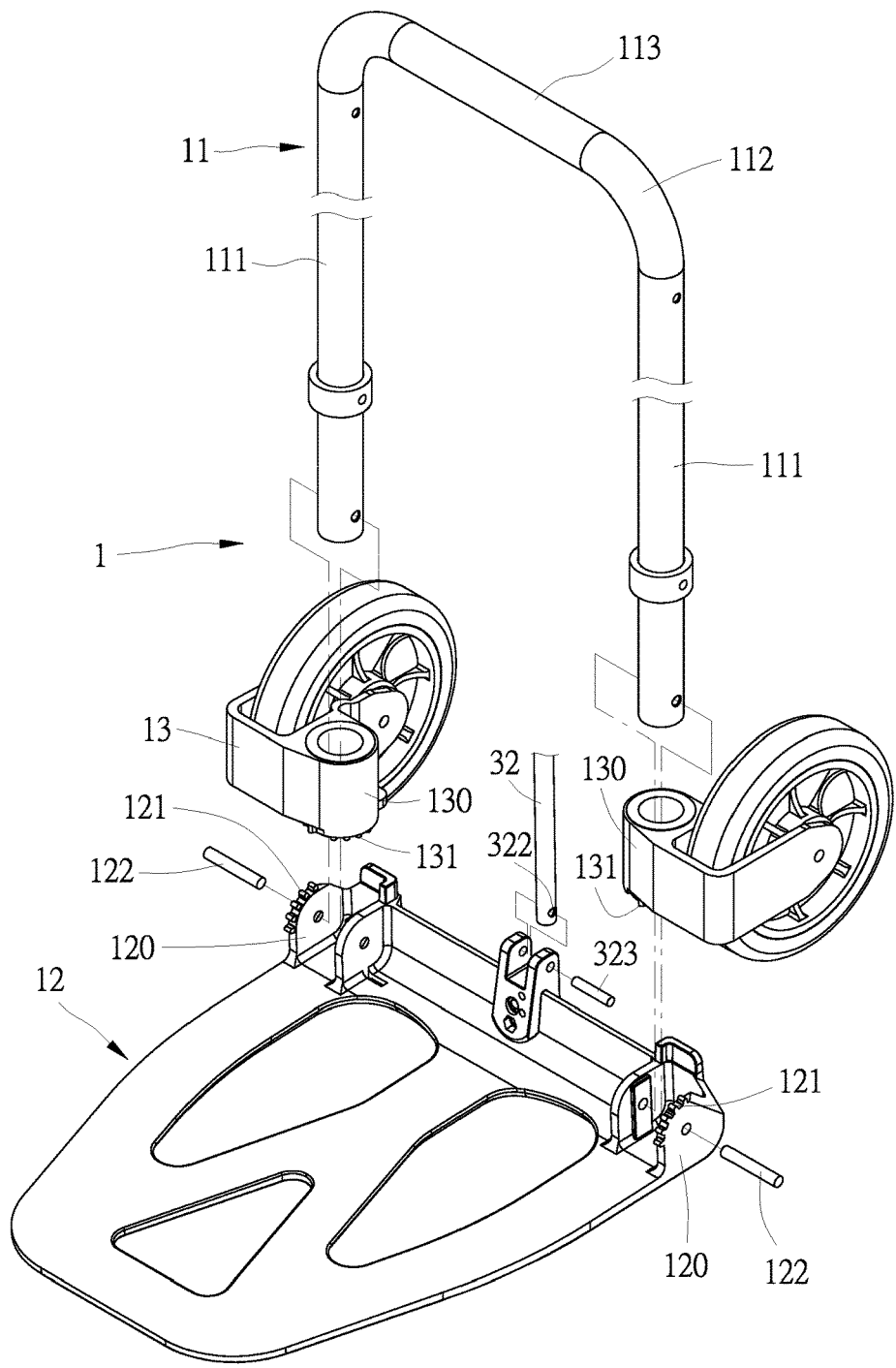
FIG. 3 is an exploded view of the trolley main body in accordance with the preferred embodiment of the present invention.

Referring to FIG. 3 and FIG. 1, in detail, the main frame (11) comprises a pair of side rods (111) and a transverse rod (112) connected with the pair of side rods (111). For example, a single tubular rod is bent into a U-shape to form the pair of side rods (111) and the transverse rod (112). The transverse rod (112) has an engaging portion (113). The base (12) is pivotally connected to the side rods (111). The base (12) includes at least one first linking portion (121) which is located close to the side rod (111). Specifically, in this embodiment, the base (12) has a pair of lugs (120). The pair of lugs (120) is pivotally connected with the side rods (111) through a pivot member (122), respectively. The pair of lugs (120) each has the first linking portion (121).

Referring to FIG. 3 and FIG. 1, the wheel seats (13) are pivotally connected to the side rods (111), respectively. At least one of the wheel seats (13) includes a second linking portion (131). The second linking portion (131) is connected with the first linking portion (121). When the base (12) is pivoted, the first linking portion (121) drives the wheel seats (13) to be unfolded or folded. Specifically, each wheel seat (13) has a sleeve portion (130). The sleeve portion (130) is pivotally connected with the side rod (111). The sleeve portion (130) of each wheel seat (13) has the second linking portion (131). Preferably, the first linking portion (121) and the second linking portion (131) each include a plurality of teeth to mesh with each other so that the wheel seats (13) and the base (12) can be folded and unfolded stably.

Figure 4:
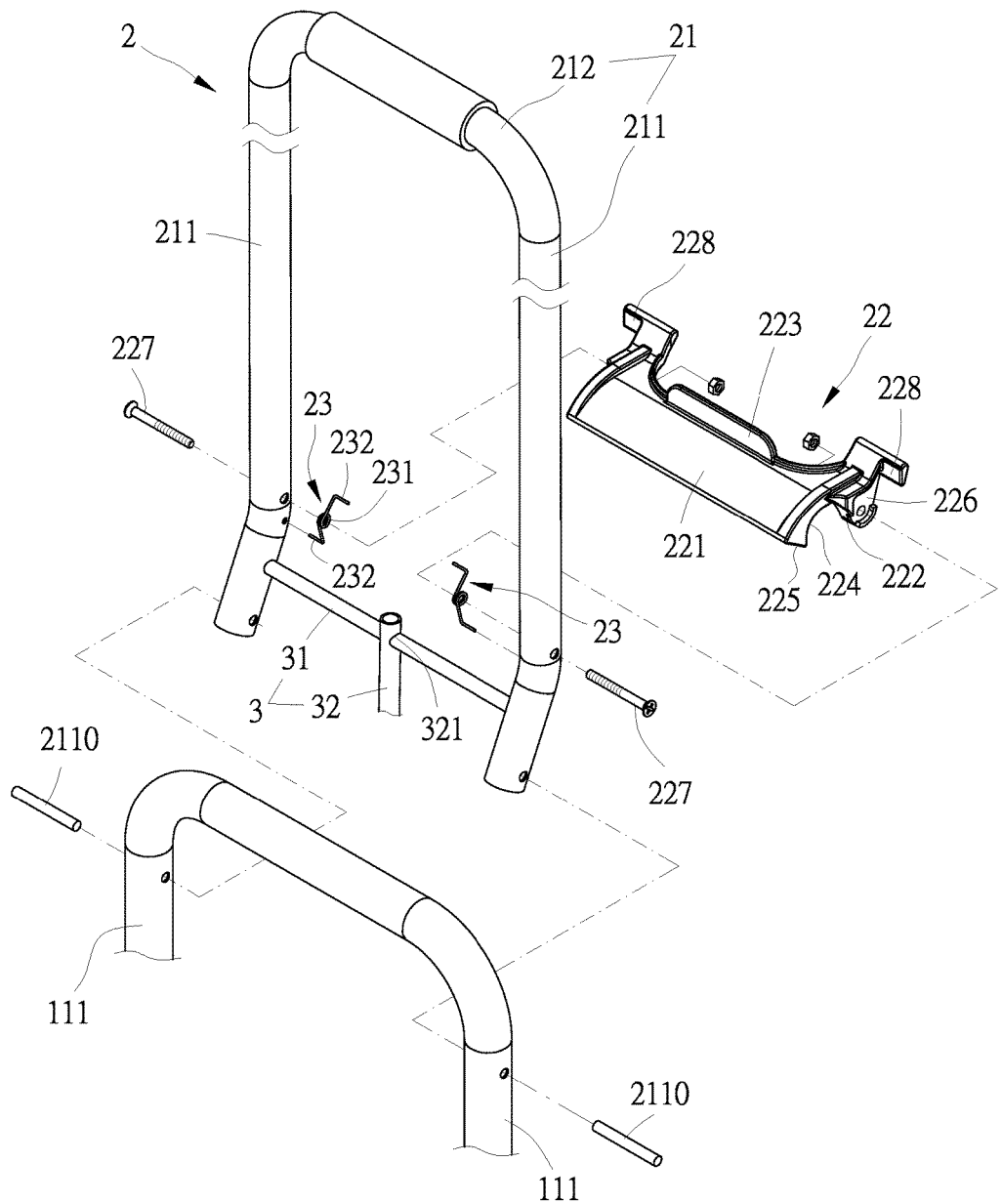
FIG. 4 is a partially exploded view in accordance with the preferred embodiment of the present invention.

Referring to FIG. 1 and FIG. 2, the handle (21) of the handle assembly (2) is displaced relative to the trolley main body (1) between a folded position and an unfolded position. Referring to FIG. 4 and FIG. 1, the handle (21) includes two support rods (211) extending in the same direction and a gripping rod (212). For example, a single tubular rod is bent into a U-shape to form the support rods (211) and the gripping rod (212). The support rods (211) are pivotally connected to the side rods (111) through first pivot members (2110), respectively. The handle assembly (2) includes a fastener (22) and at least one elastic member (23). The fastener (22) is pivotally connected to the handle (21). For example, the fastener (22) is pivotally connected between the support rods (211). The fastener (22) includes a top (221) and a bottom (222) opposite the top (221). The top (221) has a pull portion (222) thereon. The bottom (222) has an engaging groove (224). One end of the fastener (22) has a guide surface (225). As an example, the guide surface (225) is an oblique or curved surface. The elastic member (23) is connected with the handle (21) and the fastener (22) to provide an elastic force for the fastener (22) to be located at a predetermined fastening position. In detail, the fastener (22) includes a pivot portion (226). The pivot portion (26) is pivotally connected between the two support rods (211) of the handle (21) through a shaft (227). As an example, the elastic member (23) is a torsion spring. The torsion spring includes a receiving hole (231) and two connecting ends (232). The receiving hole (231) is adapted to receive the shaft (227). The two connecting ends (232) are connected with the fastener (22) and the side rod (111) of the main frame (11), respectively. Preferably, the fastener (22)

includes a stop portion (228). The stop portion (228) is configured to lean against the support rod (211) of the handle (21) for limiting the pivot range of the fastener (22).

Referring to FIG. 4 and FIG. 3, the linkage assembly (3) comprises an actuating lever (31) and a linking lever (32). For example, the linking lever (32) is fixedly connected between the two support rods (211). The actuating lever (31) is located close to the junction of the handle (21) and the trolley main body (1). Two ends of the linking lever (32) are pivotally connected to the actuating lever (31) and the base (12) of the trolley main body (1), respectively. In detail, in this embodiment, two ends of the linking lever (32) each have a pivot hole (321) (322). The pivot hole (321) is adapted for the actuating lever (31) to pass therethrough. The other pivot hole (322) is pivotally connected with the base (12) through a second pivot member (323).

Figure 5:
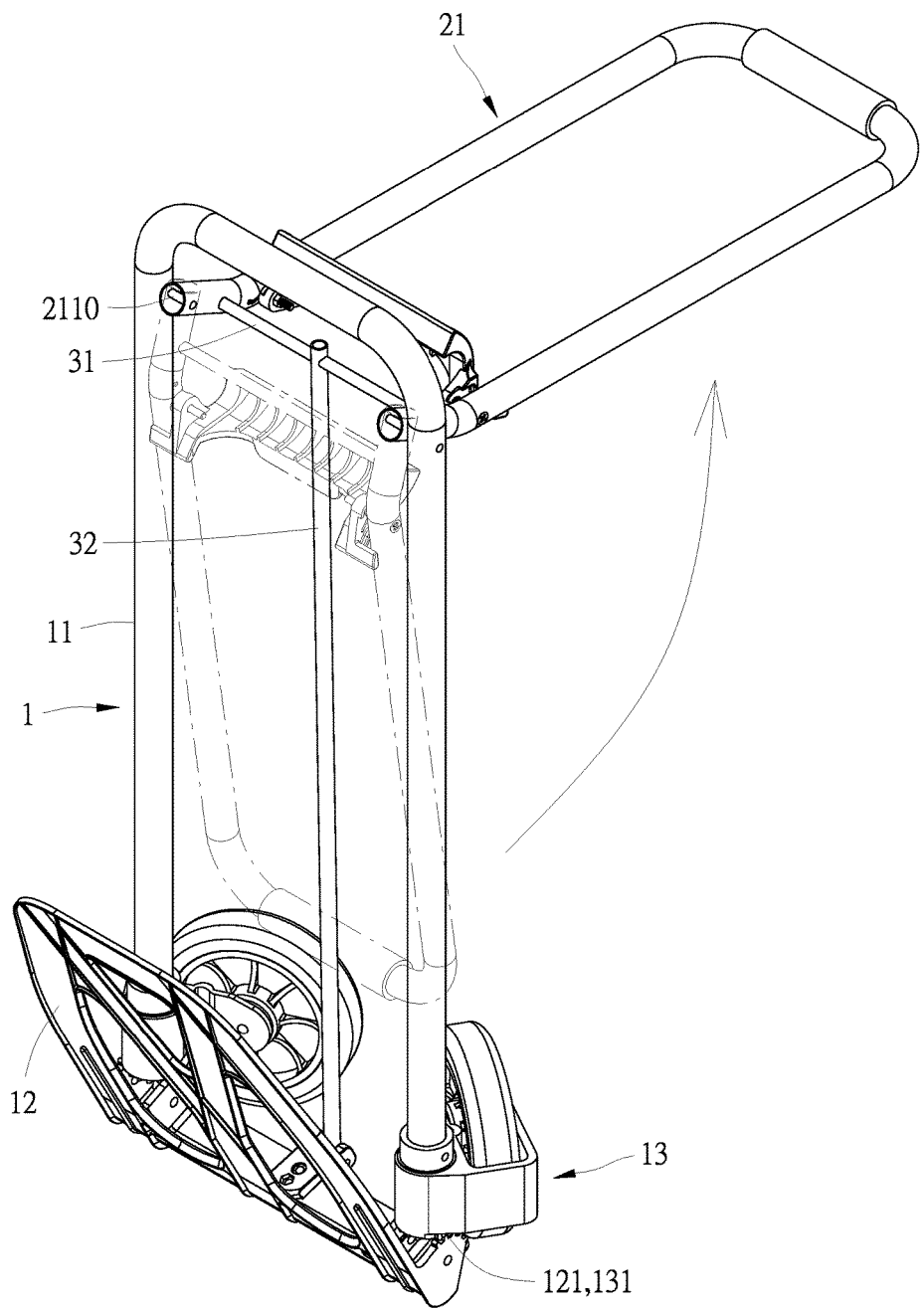
FIG. 5 is a first schematic view showing the operation of unfolding the hand trolley in accordance with the preferred embodiment of the present invention.

Referring to FIG. 5, when the hand trolley is to be unfolded, the handle (21) is displaced relative to the trolley main body (1) from the folded position to the unfolded position. The handle (21) is pivoted about the first pivot members (2110) relative to the trolley main body (1). Since there is an eccentric distance between the actuating lever (31) and the first pivot members (2110), the actuating lever (31) can drive the linking lever (32) to displace, and then the linking lever (32) links the base (12), so that the base (12) is pivoted and unfolded relative to the main frame (11). In addition, the first linking portions (121) of the base (12) link the second linking portions (131) of the wheel seats (13), so that the wheel seats (13) are pivoted and unfolded relative to the main frame (11). That is, the handle (21) directly links the base (12) and indirectly links the wheel seats (13) to be unfolded.

Figure 6:
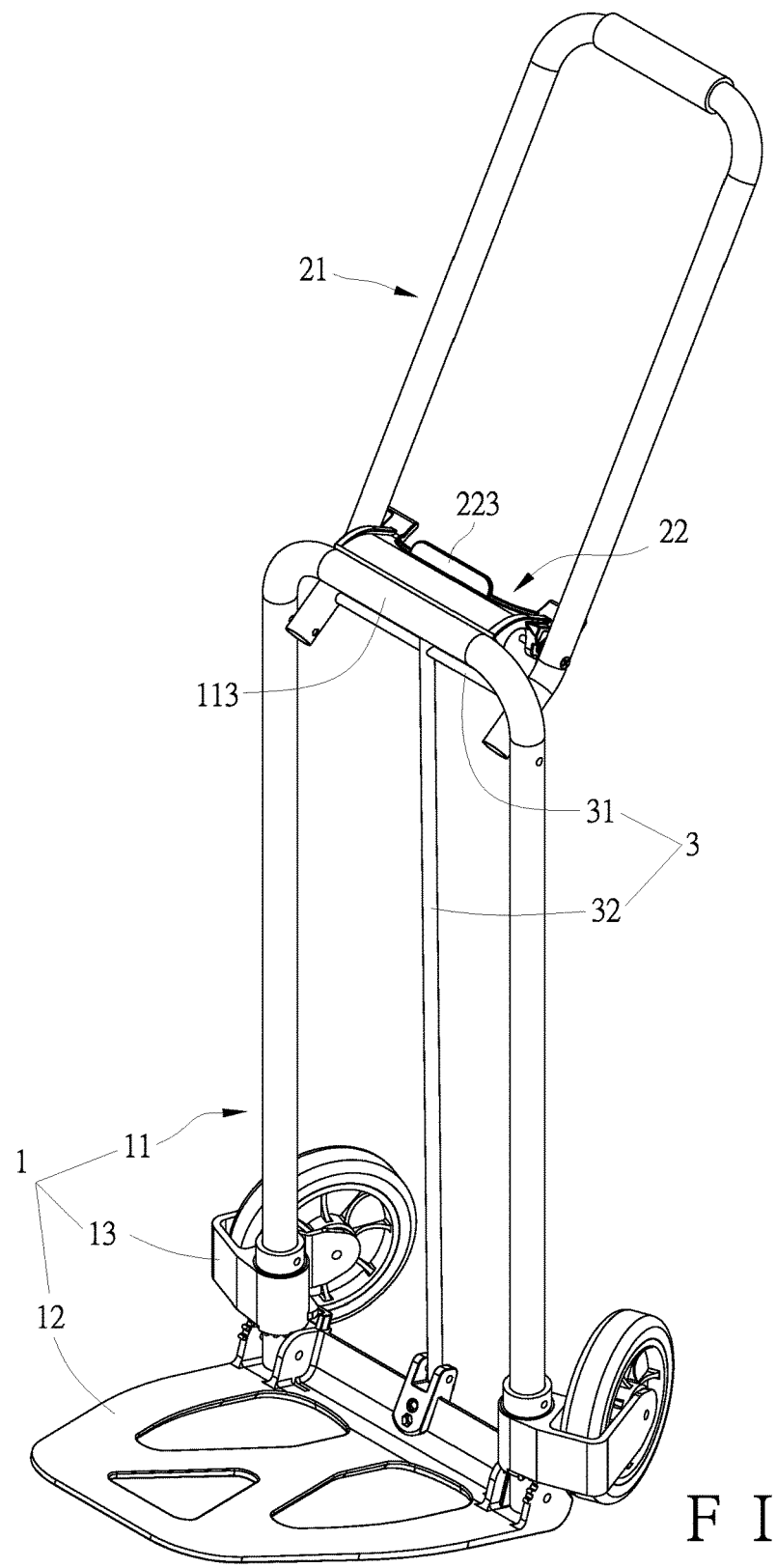
FIG. 6 is a second schematic view showing the operation of unfolding the hand trolley in accordance with the preferred embodiment of the present invention.
Figure 8:
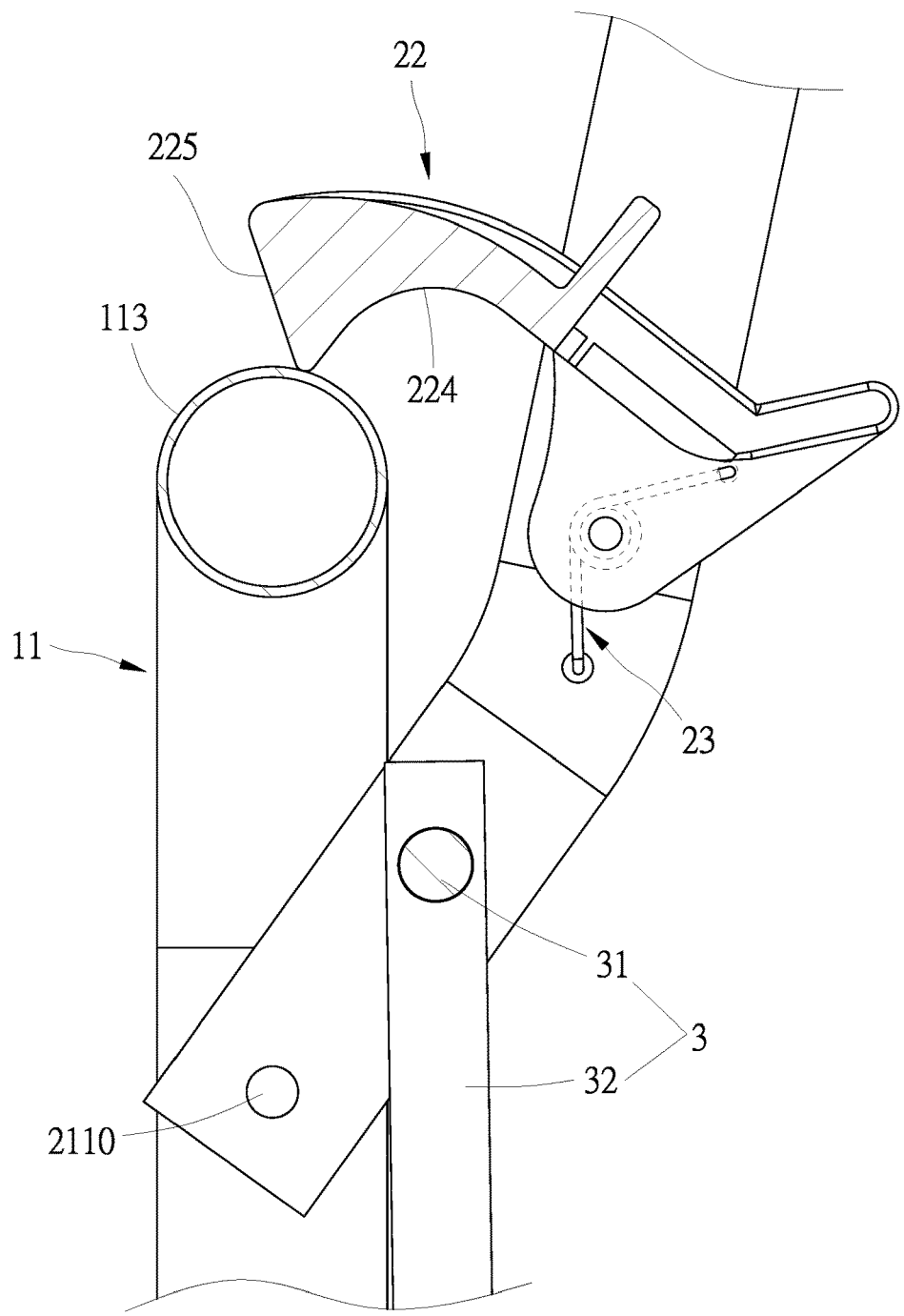
FIG. 8 is a second schematic view showing the fastening operation of the faster in accordance with the preferred embodiment of the present invention.

Referring to FIG. 6 and FIG. 7, when the handle (21) is displaced relative to the trolley main body (1) about to the unfolded position, the guide surface (225) of the fastener (22) is in contact with the engaging portion (113) of the main frame (11). The fastener (22) is pivoted because the guide surface (225) is pushed by the engaging portion (113) so that the engaging groove (224) is engaged with the engaging portion (113) (referring to FIG. 8 and FIG. 9). The hand trolley is unfolded and positioned.

Figure 9:
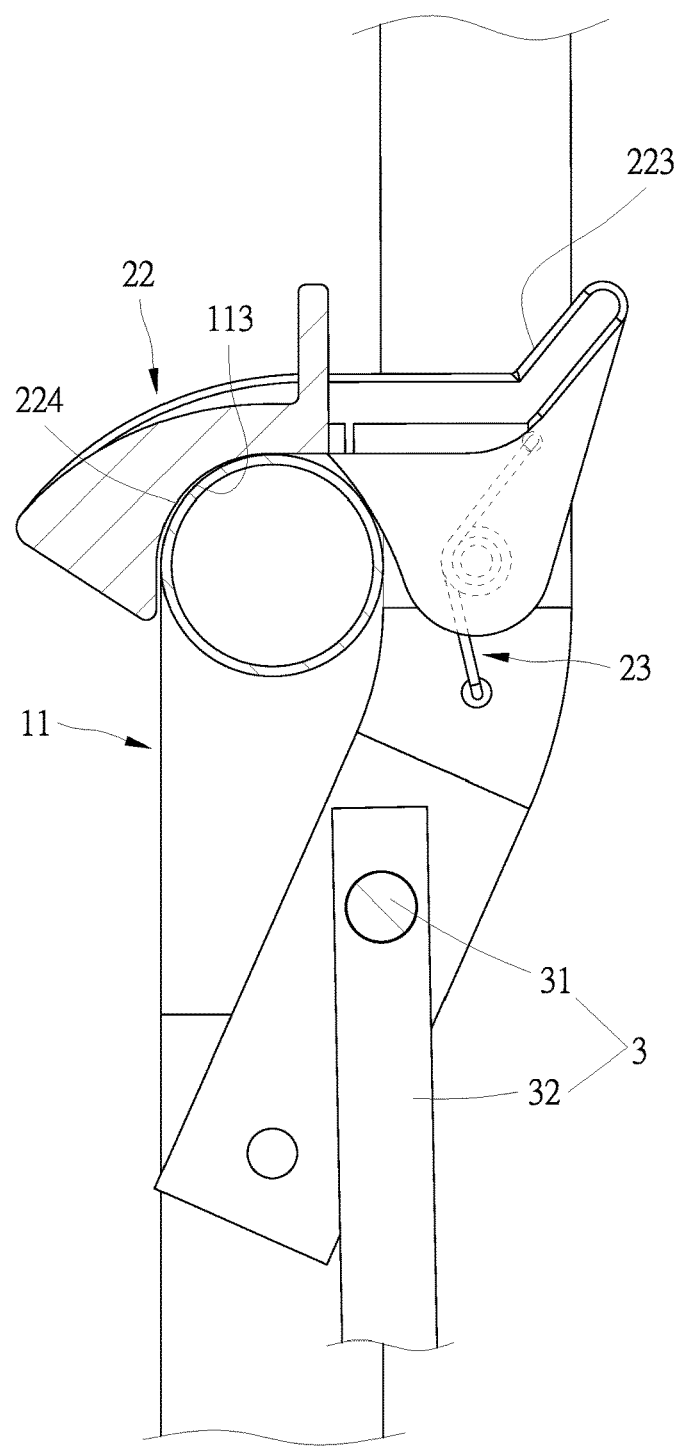
FIG. 9 is a third schematic view showing the fastening operation of the faster in accordance with the preferred embodiment of the present invention.

Referring to FIG. 9 and FIG. 6, when the hand trolley is to be folded, the pull portion (223) is pulled to disengage the engaging groove (224) of the fastener (22) from the engaging portion (113), and the handle (21) is displaced relative to the trolley main body (1) from the unfolded position to the folded position, and the handle (21) directly links the base (12) and indirectly links the wheel seats (13) to be folded through the linkage assembly (3), as shown in FIG. 2.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hand trolley, comprising:
a trolley main body, including a main frame, an engaging portion and a base, the base being pivotally connected to the main frame, the trolley main body further including a linkage assembly and the linkage assembly including an actuating lever and a linking lever, two ends of the linking lever are pivotally connected to the actuating lever and the base of the trolley main body respectively; and
a handle assembly, including a handle, a fastener and an elastic member, the handle being pivotally connected to the main frame of the trolley main body and displaceable relative to the trolley main body between a folded position and an unfolded position, the actuating lever being connected to the handle, and being located close to the junction of the handle and the trolley main body, the fastener being pivotally connected to the handle, the fastener including an engaging groove, a guide surface and a pull portion, the elastic member being connected with the handle and the fastener to provide an elastic force for the fastener to be located at a predetermined fastening position; wherein when the handle is displaced relative to the trolley main body toward the unfolded position, the engaging portion pushes the guide surface of the fastener so that the fastener is pivoted for the engaging groove to be engaged with the engaging portion; when the pull portion is pulled by an external force, the engaging groove of the fastener is disengaged from the engaging portion and when the handle is displaced relative to the trolley main body from the folded position toward the unfolded position, the handle links the base to be pivoted through the linking lever.

2. The hand trolley as claimed in claim 1, wherein the handle includes two support rods extending in a same direction, and the actuating lever is fixedly connected between the two support rods.

3. The hand trolley as claimed in claim 2, wherein the linking lever has a pivot hole, and the actuating lever is pivotally connected to the pivot hole.

4. The hand trolley as claimed in claim 3, wherein the fastener includes a stop portion, and the stop portion is configured to lean against the handle.

5. The hand trolley as claimed in claim 1, wherein the base includes a first linking portion, the trolley main body includes two wheel seats, each of the wheel seats is pivotally connected to a side rod of the main frame, each of the wheel seats includes a second linking portion, and the second linking portion is connected with the first linking portion for driving the wheel seats to be unfolded or folded when the base is pivoted.

6. The hand trolley as claimed in claim 5, wherein the first linking portion and the second linking portion each include a plurality of teeth to mesh with each other.

7. The hand trolley as claimed in claim 1, wherein the fastener includes a pivot portion, the pivot portion is pivotally connected to the handle through a shaft, the elastic member is a torsion spring, the torsion spring includes a receiving hole and two connecting ends, the receiving hole is adapted to receive the shaft, the two connecting ends are connected with the fastener and the main frame, respectively.

8. The hand trolley as claimed in claim 1, wherein the fastener includes a top and a bottom opposite the top, the pull portion is located on the top, and the engaging groove is located in the bottom.

9. A hand trolley, comprising:
a trolley main body, including a main frame, a base and two wheel seats, the main frame including a pair of side rods and a transverse rod connected with the pair of side rods, the transverse rod having an engaging portion, the base being pivotally connected to the side rods, the base including at least one first linking portion, the first linking portion being located close to one of the side rods, the wheel seats being pivotally connected to the side rods respectively, at least one of the wheel seats including a second linking portion, the second linking portion being connected with the first linking portion for driving the wheel seats to be unfolded or folded when the base is pivoted;

a handle assembly, including a handle, a fastener and an elastic member, the handle being displaced relative to the trolley main body between a folded position and an unfolded position, the handle including two support rods extending in a same direction, the fastener being pivotally connected to the handle, the fastener including an engaging groove, a guide surface and a pull portion, the elastic member being connected with the handle and the fastener to provide an elastic force for the fastener to be located at a predetermined fastening position; wherein when the handle is displaced relative to the trolley main body toward the unfolded position, the engaging portion pushes the guide surface of the fastener so that the fastener is pivoted for the engaging groove to be engaged with the engaging portion; when the pull portion is pulled by an external force, the engaging groove of the fastener is disengaged from the engaging portion; and a linkage assembly, including an actuating lever and a linking lever, the actuating lever being connected between the two support rods, the actuating lever being located close to the junction of the handle and the trolley main body, two ends of the linking lever being pivotally connected to the actuating lever and the base of the trolley main body respectively, wherein when the handle is displaced relative to the trolley main body from the folded position toward the unfolded position, the handle links the base to be pivoted through the linking lever.

* * * * *